US011158847B2

(12) United States Patent
Lee et al.

(10) Patent No.: US 11,158,847 B2
(45) Date of Patent: Oct. 26, 2021

(54) NEGATIVE ELECTRODE ACTIVE MATERIAL AND NEGATIVE ELECTRODE INCLUDING THE SAME

(71) Applicant: LG CHEM, LTD., Seoul (KR)

(72) Inventors: So-Ra Lee, Daejeon (KR); Seo-Young Kwon, Daejeon (KR); Jee-Eun Kim, Daejeon (KR); Ji-Young Park, Daejeon (KR); Pil-Kyu Park, Daejeon (KR); Hyeon-Min Song, Daejeon (KR); Kwi-Sub Yun, Daejeon (KR); U-Jin Yoon, Daejeon (KR); Jae-Young Lee, Daejeon (KR); Yong-Ju Lee, Daejeon (KR); Jung-Hyun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 86 days.

(21) Appl. No.: 16/320,197

(22) PCT Filed: Dec. 22, 2017

(86) PCT No.: PCT/KR2017/015390
§ 371 (c)(1),
(2) Date: Jan. 24, 2019

(87) PCT Pub. No.: WO2018/117752
PCT Pub. Date: Jun. 28, 2018

(65) Prior Publication Data
US 2019/0273247 A1    Sep. 5, 2019

(30) Foreign Application Priority Data

Dec. 23, 2016  (KR) .......................... 10-2016-0178317

(51) Int. Cl.
*H01M 4/36* (2006.01)
*H01M 4/38* (2006.01)
(Continued)

(52) U.S. Cl.
CPC ............ *H01M 4/364* (2013.01); *H01M 4/366* (2013.01); *H01M 4/386* (2013.01); *H01M 4/58* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,383,686 B1 * | 5/2002 | Umeno | H01M 4/38 429/231.8 |
| 9,966,598 B2 * | 5/2018 | Cui | H01M 4/364 |

(Continued)

FOREIGN PATENT DOCUMENTS

| | | |
|---|---|---|
| CN | 105576241 A | 5/2016 |
| CN | 105789555 A | 7/2016 |

(Continued)

OTHER PUBLICATIONS

International Search Report issued in PCT/KR2017/015390, dated Apr. 27, 2018.

Primary Examiner — Ula C Ruddock
Assistant Examiner — Sarika Gupta
(74) Attorney, Agent, or Firm — Birch, Stewart, Kolasch & Birch, LLP (57) ABSTRACT

Composite particles and a negative electrode active material including such particles for an electrochemical device. The negative electrode active material is capable of lithium intercalation/deintercalation and includes composite particles including a carbon phase including a carbonaceous material, silicon (Si) and lithium fluoride (LiF). The Si and LiF may be present as Si—LiF mixed particles, which are dispersed in the carbon phase, wherein the Si—LiF mixed particles are dispersed in the carbon phase with uniform or (Continued)

non-uniform distribution. In addition, the composite particles include the carbon phase mixed uniformly or amorphously with the Si—LiF mixed particles.

13 Claims, 2 Drawing Sheets

(51) Int. Cl.
  H01M 4/58 (2010.01)
  H01M 4/587 (2010.01)
  H01M 10/42 (2006.01)
  H01M 4/62 (2006.01)
  H01M 4/02 (2006.01)
  H01M 4/1393 (2010.01)
  H01M 4/04 (2006.01)
  H01M 4/1395 (2010.01)
  H01M 4/134 (2010.01)

(52) U.S. Cl.
  CPC .......... *H01M 4/582* (2013.01); *H01M 4/587* (2013.01); *H01M 4/625* (2013.01); *H01M 10/4235* (2013.01); *H01M 4/0471* (2013.01); *H01M 4/134* (2013.01); *H01M 4/1393* (2013.01); *H01M 4/1395* (2013.01); *H01M 2004/027* (2013.01)

(56) References Cited

U.S. PATENT DOCUMENTS

| | | | | |
|---|---|---|---|---|
| 10,135,095 | B2* | 11/2018 | Yoon | ............... H01M 4/583 |
| 2004/0062990 | A1 | 4/2004 | Shimamura et al. | |
| 2006/0068287 | A1* | 3/2006 | Morita | ............... H01M 10/052 |
| | | | | 429/223 |
| 2008/0020926 | A1 | 1/2008 | Guillaume et al. | |
| 2011/0300444 | A1 | 12/2011 | Nakamura | |
| 2015/0155546 | A1 | 6/2015 | Yushin et al. | |
| 2016/0006027 | A1 | 1/2016 | Kim et al. | |
| 2016/0336592 | A1 | 11/2016 | Hirose et al. | |
| 2016/0351947 | A1* | 12/2016 | Kamo | ............... H01M 4/587 |
| 2016/0365567 | A1 | 12/2016 | Troegel et al. | |
| 2017/0040599 | A1 | 2/2017 | Kamo et al. | |

FOREIGN PATENT DOCUMENTS

| | | |
|---|---|---|
| CN | 106207177 A | 12/2016 |
| JP | 2002-216751 A | 8/2002 |
| JP | 2004-103340 A | 4/2004 |
| JP | 2008-23524 A | 2/2008 |
| JP | 2008-277232 A | 11/2008 |
| JP | 2011-253762 A | 12/2011 |
| JP | 2015-149224 A | 8/2015 |
| JP | 2016-509739 A | 3/2016 |
| KR | 10-0609862 B1 | 8/2006 |
| KR | 10-2014-0070227 A | 6/2014 |
| KR | 10-2014-0132178 A | 11/2014 |
| KR | 10-2016-0110380 A | 9/2016 |
| KR | 10-2016-0118260 A | 10/2016 |
| KR | 10-1680459 B1 | 11/2016 |
| WO | WO 2016/057369 A2 | 4/2016 |
| WO | WO 2017/011594 A1 | 1/2017 |

* cited by examiner

NEGATIVE ELECTRODE ACTIVE MATERIAL AND NEGATIVE ELECTRODE INCLUDING THE SAME

TECHNICAL FIELD

The present application claims priority to Korean Patent Application No. 10-2016-0178317 filed on Dec. 23, 2016 in the Republic of Korea, the disclosures of which are incorporated herein by reference.

The present disclosure relates to a negative electrode active material for an electrochemical device and an electrochemical device, such as a lithium ion secondary battery, including the negative electrode active material.

BACKGROUND ART

Recently, as electronic instruments have been downsized and lightened, batteries functioning as electric power sources thereof have also been required to be downsized and lightened. As such downsized and lightened and high-capacity chargeable/dischargeable batteries, lithium secondary batteries have been commercialized and used for portable electronic instruments, such as compact video cameras, cellular phones and notebook computers, communication devices, or the like.

In general, a lithium secondary battery includes a positive electrode (cathode), a negative electrode (anode) and an electrolyte. In addition, lithium ions deintercalated from a positive electrode active material upon the first charging are intercalated into a negative electrode active material, such as carbon particles, and deintercalated again upon discharging. In this manner, charging/discharging is allowed, since lithium ions reciprocate between the positive electrode and the negative electrode while transferring energy.

Meanwhile, development of portable electronic instruments continuously has required high-capacity batteries. Thus, active studies have been conducted about a high-capacity negative electrode material, such as Sn or Si, having a significantly higher capacity per unit weight as compared to carbon used conventionally as a negative electrode material. Particularly, it is known that Si is a high-capacity negative electrode material which is cheap and has high capacity, i.e., a discharge capacity (about 4200 mAh/g) corresponding to about 10 times of the discharge capacity of graphite used conventionally as a negative electrode material.

However, Si is an insulator, causes rapid volumetric swelling during charging/discharging and side reactions derived therefrom, forms an unstable solid electrolyte interphase (SEI) film to cause degradation of the performance of a battery, and thus is limited in terms of commercialization.

Various attempts have been made about use of a Si material for a negative electrode. For example, Japanese Patent Laid-Open No. 2004-103340 (Patent Document 1) discloses forming a swelling-inhibiting phase by alloying a lithium intercalatable metal, such as silicon, tin, or zinc, with a Group 2A element or transition metal and forming crystallites of the lithium intercalatable metal to inhibit degradation of cycle characteristics caused by charging/discharging. In addition, Japanese Patent Laid-Open No. 2008-023524 (Patent Document 2) discloses a negative electrode material for a lithium ion secondary battery, which includes a composite material having a structure formed of particles subjected to treatment for imparting compression force and shear force and having a coating film including a carbonaceous material on at least a part of the surface thereof, and a graphitic material that is in close contact with the silicon particles. According to Patent Document 2, since adhesion between metal particles and adhesion between metal particles and the carbonaceous material are high, no separation occurs among the metal particles themselves or between the metal particles and the carbonaceous material due to the swelling/shrinking caused by charging/discharging. Therefore, it is thought that the negative electrode material for a lithium ion secondary battery provides a discharge capacity higher than the theoretical capacity (372 mAh/g) of graphite and shows excellent cycle characteristics and initial charge/discharge efficiency. However, in the disclosure of Patent Document 1, since the surface of alloy particles is susceptible to oxidation and has lower conductivity as compared to a carbonaceous material, charging/discharging is not performed smoothly in some cases. Particularly, at the end of discharging where the electric resistance of an active material is increased, sufficient discharging is not performed and lithium ions are retained inside of the particles near the surface thereof, resulting in deterioration of the battery. In addition, in the Group 2 and 3 elements capable of alloying with Li upon intercalation/deintercalation of lithium ions, a plurality of Li-intercalating phases including silicon are present when a metal element, such as Al, is contained. In this case, deterioration of the battery is accelerated. In addition, in the disclosure of Patent Document 2, when forming a composite between crystalline silicon having a high swelling ratio with graphite, the swelled silicon is not retained in the pores of the graphite but is separated to cause disintegration of particles due to a difference in swelling ratio between them corresponding to 4 or higher. As a result, cycle characteristics are degraded. Thus, there is a need for developing a novel negative electrode active material using a silicon material.

DISCLOSURE

Technical Problem

The present disclosure is directed to providing a negative electrode active material which has high initial efficiency and causes little irreversible phenomenon. The present disclosure is also directed to providing a negative electrode including the negative electrode active material, and an electrochemical device including the negative electrode and having excellent life characteristics. It will be easily understood that the other objects and advantages of the present disclosure may be realized by the means shown in the appended claims and combinations thereof.

Technical Solution

The present disclosure relates to composite particles that can be used as a negative electrode active material and a battery including the same.

According to a first embodiment of the present disclosure, there are provided composite particles which include a carbon phase including a carbonaceous material, silicon and lithium fluoride (LiF), wherein the Si and LiF are present as Si—LiF mixed particles, wherein the Si—LiF mixed particles are dispersed in the carbon phase with uniform or non-uniform distribution.

According to a second embodiment of the present disclosure, there are provided the composite particles of the first embodiment, wherein the Si—LiF mixed particles include Si particles at least partially surface-coated with LiF or Si particles mixed homogeneously or non-homogeneously with LiF, and the Si particles have a particle diameter ($D_{50}$) of 1 nm-700 nm.

According to a third embodiment of the present disclosure, there are provided the composite particles of the second embodiment, wherein the Si particles have a crystallite size La of 20 nm or less as determined by X-ray diffractometry (XRD).

According to a fourth embodiment of the present disclosure, there are provided the composite particles of any one the first to the third embodiments, wherein the carbonaceous material is a homogeneous mixture or non-homogeneous mixture of high crystalline carbon with low crystalline carbon.

According to a fifth embodiment of the present disclosure, there are provided the composite particles of any one the first to the fourth embodiments, wherein the carbonaceous material is any one selected from the group consisting of natural graphite, artificial graphite, carbon nanotubes, low crystalline soft carbon, graphene, fullerene, carbon fibers, pyrolitic carbon, mesophase pitch based carbon fibers, meso-carbon microbeads, mesophase pitches and petroleum or coal tar pitch derived cokes and carbon black, or a combination of two or more of them.

According to a sixth embodiment of the present disclosure, there are provided the composite particles of any one the first to the fifth embodiments, which include the carbonaceous material in an amount of 10-90 wt %.

According to a seventh embodiment of the present disclosure, there are provided the composite particles of any one the first to the sixth embodiments, which have a particle diameter of 1 μm-100 μm and have a 50% particle diameter ($D_{50}$) of 1 μm-50 μm in a particle size distribution of cumulative volume.

According to an eighth embodiment of the present disclosure, there are provided the composite particles of any one the first to the seventh embodiments, which are at least partially surface-coated with a coating layer containing a low crystalline carbonaceous material, and the coating layer has a thickness of 5 nm-100 nm.

According to a ninth embodiment of the present disclosure, there are provided the composite particles of the eighth embodiment, wherein the coating layer includes the low crystalline carbonaceous material in an amount of 90 wt % or more based on 100 wt % of the coating layer.

According to a tenth embodiment of the present disclosure, there are provided a negative electrode active material and a negative electrode including the composite particles as defined in any one the first to the ninth embodiments.

According to an eleventh embodiment of the present disclosure, there is provided a method for preparing the composite particles as defined in any one the first to the ninth embodiments, the method including the following steps (S10) to (S50) of:

(S10) preparing Si—LiF mixed particles;
(S20) preparing a slurry including the Si—LiF mixed particles, a carbon precursor and a carbonaceous material;
(S30) drying the slurry;
(S40) heat treating the dried product obtained from step (S30) to obtain a precursor of composite particles; and
(S50) micronizing the precursor of composite particles obtained from step (S40) to obtain composite particles.

According to a twelfth embodiment of the present disclosure, there is provided the method for preparing the composite particles of the eleventh embodiments, wherein the carbon precursor is present as a carbon precursor solution which includes at least one selected from the group consisting of polyacrylonitrile, polyvinyl alcohol, cellulose and pitch, dispersed in a dispersion medium.

According to a thirteenth embodiment of the present disclosure, there is provided the method for preparing the composite particles of the eleventh or twelfth embodiment, wherein step (S10) of preparing the Si—LiF mixed particles is carried out by mechanically mixing Si with LiF.

According to a fourteenth embodiment of the present disclosure, there is provided the method for preparing the composite particles of the thirteenth embodiments, wherein Si is a Si material having a purity of 98% or less.

According to a fifteenth embodiment of the present disclosure, there is provided the method for preparing the composite particles of any one of the eleventh to the fourteenth embodiments, wherein the carbon precursor is at least one selected from the group consisting of polyacrylonitrile, polyvinyl alcohol, cellulose and pitch.

According to a sixteenth embodiment of the present disclosure, there is provided the method for preparing the composite particles of any one of the eleventh to the fifteenth embodiments, wherein step (S40) is carried out at 400° C.-1,100° C.

Advantageous Effects

The negative electrode material according to the present disclosure has a higher initial efficiency as compared to the conventional silicon-carbon composite negative electrode materials, is inhibited from volumetric swelling, and thus reduces an irreversible phenomenon. In addition, it is possible to realize improvement of conductivity and uniform dispersion of active material particles in the electrode. Therefore, when providing a battery including the negative electrode material according to the present disclosure, it is possible to improve the life characteristics of the battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is linked to another portion' includes not only 'one portion is linked directly to another portion' but also 'one portion is linked electrically to another portion with the other portion interposed between them'.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect, there is provided a negative electrode active material for an electrochemical device. The negative electrode active material is capable of lithium intercalation/deintercalation, and includes composite particles containing silicon (Si), lithium fluoride (LiF) and a carbonaceous material.

Figure 1:
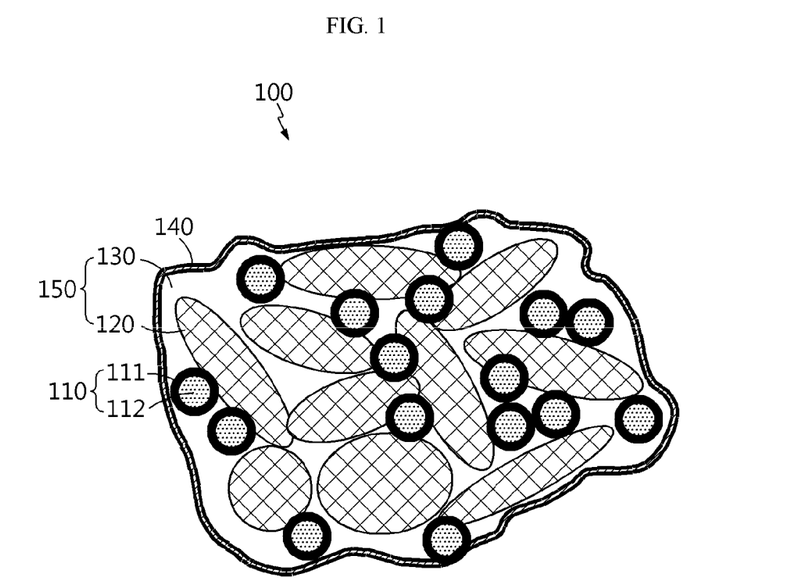
FIG. 1 is a schematic view illustrating the internal constitution of the composite particles according to the present disclosure.

According to the present disclosure, the composite particles include a carbon phase containing a carbonaceous material, and Si—LiF mixed particles distributed in the carbon phase. According to an embodiment of the present disclosure, the mixed particles are dispersed in the carbon phase with uniform or non-uniform distribution. Preferably, the mixed particles have uniform distribution in the carbon phase. According to an embodiment of the present disclosure, the composite particles may include the carbon phase mixed uniformly or non-uniformly with the Si—LiF mixed particles. FIG. 1 is a schematic sectional view illustrating the composite particles 100 according to an embodiment of the present disclosure. Herein, drawing numeral 110 represents Si—LiF mixed particles, 111 represents LiF, and 112 represents Si. In addition, drawing numeral 150 represents a carbon phase, which may include a high crystalline carbonaceous material 120 and low crystalline and/or amorphous carbonaceous material 130. Further, drawing numeral 140 represents a coating layer with which the surfaces of the composite particles are coated, as described hereinafter.

According to an embodiment of the present disclosure, the composite particles include the carbonaceous material in an amount of 10-90 wt % based on the total weight of the composite particles. The carbonaceous material functions to connect the mixed particles electrically among themselves, buffer the swelling of mixed particles, retain the powder structure, or the like. The carbonaceous material may be present in an amount of 15 wt % or more, 25 wt % or more, 35 wt % or more, 45 wt % or more, or 55 wt % or more, within the above-defined range. In addition, the carbonaceous material may be present in an amount of 85 wt % or less, 75 wt % or less, 65 wt % or less, or 55 wt % or less, within the above-defined range.

According to the present disclosure, the Si—LiF mixed particles may be a homogeneous or non-homogeneous mixture phase of LiF with Si particles, or may include Si particles at least partially surface-coated with LiF. According to the present disclosure, LiF is distributed largely on the surface of the Si material. For example, LiF may be distributed continuously and uniformly over the whole surface of particle-state (particulate) Si. Otherwise, LiF may be distributed discontinuously on the Si surface in a microparticle phase. Considering easy processability of the preparation, the latter is preferred and thus LiF may be distributed continuously or discontinuously on the surface of the Si material.

According to the present disclosure, the expression 'the surface of the Si material is coated with LiF' means that the ratio of LiF present on the surface of the Si material is relatively higher than the ratio of LiF present as an independent phase, such as single power or aggregate. Preferably, LiF is distributed at a ratio of at least 50% of the surface area of Si particles. When LiF is distributed on the surface of Si particles at a ratio less than 50%, it is difficult to realize a desired effect of improving capacity maintenance.

According to the present disclosure, the Si particles have a particle diameter ($D_{50}$) of 1 nm-700 nm. The particle diameter of Si ($D_{50}$) may be controlled adequately within the above-defined range. Particularly, the lower limit of the particle diameter may be 5 nm, 10 nm, 20 nm, 30 nm, 50 nm, 100 nm or 200 nm, and the upper limit thereof may be 600 nm, 500 nm, 450 nm, 400 nm, 350 nm, 300 nm, 250 nm, 200 nm or 100 nm. In addition, the size of silicon crystallites in the mixed particles corresponds to a La value of 30 nm or less as determined by XRD. According to the present disclosure, the size of crystallites may be obtained by introducing the values measured by a diffraction system using X-ray to the half-width and Scherrer equation [$D(Å)=K*\lambda/(\beta*\cos\theta)$, wherein K is an integer, $\lambda$, is a wavelength of X-ray, $\beta$ is extension of diffracted rays depending on the size of crystallite, and $\theta$ is a diffraction angle $2\theta/\theta$]. In addition, according to the present disclosure, the crystallite size La is the crystallite size along a-axis as determined by X-ray diffractometry of Si particles in a particle state.

According to an embodiment of the present disclosure, when the Si—LiF mixed particles include LiF coated continuously or discontinuously on the surface of particulate Si, the LiF coating layer has a thickness of 0.1 nm-50 nm.

When Si has an excessively large particle diameter, it is difficult for lithium to react with Si being inner part of the particles and lithium intercalation/deintercalation mainly occurs on the surface layer of Si particles where reaction with lithium occurs with ease, resulting in expansion and cracking of the particle surface portion. When this occurs repeatedly, micronization may be generated. For this, Si may be exfoliated and/or separated and thus Si cannot retain the contact with a current collector, thereby causing rapid degradation in charge/discharge capacity as a function of cycles. Therefore, it is required for Si to have a fine texture to a size with which micronization does not occur. Therefore, Si has a crystallite size (La) of 20 nm or less, preferably 10 nm or less.

As described hereinafter, the mixed particles may be obtained by adding LiF during the micronization of Si using mechanical mixing so that LiF may be mixed or complexed with Si, or by coating the surfaces of Si particles with LiF.

According to an embodiment of the present disclosure, LiF may be present in the mixed particles in an amount of 0.1-50 parts by weight based on 100 parts by weight of Si, and the amount may be 1 part by weight or more, 5 parts by weight or more, 10 parts by weight or more, 20 parts by weight or more, 25 parts by weight or more, or 30 parts by weight or more, within the above-defined range. In addition, the amount may be 45 parts by weight or less, 40 parts by weight or less, 35 parts by weight or less, 30 parts by weight or less, 25 parts by weight or less, or 10 parts by weight or less.

In addition, Si may be present in the mixed particles in an amount of 5-90 wt % based on 100 wt % of the composite particles.

The carbon phase includes a carbonaceous material. According to an embodiment of the present disclosure, the carbonaceous material includes at least one of a high crystalline carbonaceous material, low crystalline carbonaceous material and amorphous hard carbon. The carbonaceous material may be a homogeneous or non-homogeneous mixture of such carbonaceous materials. According to an embodiment of the present disclosure, the composite particles preferably include high crystalline carbon as a carbonaceous material. Particular examples of the carbonaceous material include, but are not limited to: natural graphite, artificial graphite, carbon nanotubes, low crystalline soft carbon, carbon nanotubes, graphene, fullerene, carbon fibers, pyrolitic carbon, mesophase pitch based carbon fibers, meso-carbon microbeads, mesophase pitches and petroleum or coal tar pitch derived cokes and carbon black.

The carbon phase may be a mixed phase including a low crystalline carbonaceous material and/or amorphous carbonaceous material in combination with a high crystalline carbonaceous material. According to an embodiment of the present disclosure, the carbon phase may include a highly crystalline carbonaceous material distributed homogeneously or non-homogeneously in the three-dimensional matrix containing at least one of a low crystalline carbonaceous material and amorphous hard carbon. The matrix not only serves as a support which allows the composite particles to retain a physically stable particle state but also functions to connect the high crystalline carbonaceous material electrically with the Si—LiF mixed particles.

According to an embodiment of the present disclosure, the composite particles may optionally be provided with a coating layer with which the particle surfaces are coated at least partially. The coating layer includes a low crystalline carbonaceous material and/or amorphous carbonaceous material, wherein the low crystalline and/or amorphous carbonaceous material is present in an amount of 70 wt % or more, 80 wt % or more, or 90 wt % or more based on the total weight of the coating layer. The coating area of the coating layer is 70% or more, 80% or more, or 90% or more based on the surface area of the particles. In addition, according to an embodiment of the present disclosure, the coating layer has a thickness of 5 nm-100 nm, and the lower limit of the thickness may be 10 nm, 20 nm, 30 nm, 40 nm or 50 nm, within the above-defined range. Meanwhile, the upper limit of the thickness of the coating layer may be 100 nm, 90 nm, 80 nm, 70 nm or 60 nm, within the above-defined range. When the composite particles are coated with the coating layer, the composite particles have improved conductivity and the Si—LiF mixed particles can be prevented from being exposed to the outside by virtue of the coating layer. Further, the coating provides active material particles with increased shelf stability. Thus, the coating layer is formed to a large thickness within the applicable range.

According to an embodiment of the present disclosure, the low crystalline carbonaceous material may include soft carbon and/or at least one of the low crystalline products obtained by heat treating soft carbon at a temperature of about 1000° C. or less. Meanwhile, the amorphous carbonaceous material may include at least one selected from hard carbon, carbon black, thermal black and acetylene black.

According to an embodiment of the present disclosure, the coating layer may be formed by coating the composite particles with a carbon precursor material, such as a polymer material or pitch, and carrying out heat treatment (carbonization) thereof at a temperature of about 500° C. to about 1000° C. Herein, when the carbonization temperature is excessively high, it may affect the crystal structures of the ingredients forming the composite particles. Thus, it is preferred that the heat treatment is controlled within the above-defined range. According to another embodiment, the coating layer may be formed by coating the surfaces of the composite particles directly with conductive carbon particles. Particular examples of such conductive carbon particles include, but are not limited to: carbon black, such as acetylene black, thermal black, furnace black or channel black, and carbon fibers, carbon tubes, or the like.

According to an embodiment of the present disclosure, the composite particles have a particle diameter of 1 μm-100 μm. The composite particles may have a particle diameter of 80 μm or less, 70 μm or less, 50 μm or less, 40 μm or less, or 30 μm or less, within the above-defined range. In addition, the composite particles may have a particle diameter of 3 μm or more, 5 μm or more, 10 μm or more, 15 μm or more, or 20 μm or more, within the above-defined range. Further, the composite particles may have a 50% particle diameter ($D_{50}$) of 1 μm-50 μm in the particle size distribution of cumulative volume. In addition, the upper limit of $D_{50}$ may be 45 μm, 40 μm, 35 μm, 30 μm, 25 μm or 20 μm, within the above-defined range. Meanwhile, the composite particles may have a 90% particle diameter ($D_{50}$) of 40 μm or less, 30 μm or less, 25 μm or less, or 20 μm or less in the particle size distribution of cumulative volume. Determination of the 50% particle diameter and 90% particle diameter in the particle size distribution of cumulative volume may be carried out by using a laser diffraction particle size distribution measuring system available from Nikkiso Company from a cumulative frequency as measured after dispersing the particles for 3 minutes by the embedded ultrasonic waves.

Next, the method for preparing the composite particles will be explained. The method for preparing the composite particles includes the following steps (S10) to (S50).

First, Si—LiF mixed particles are prepared (S10).

According to an embodiment of the present disclosure, the mixed particles may be obtained by adding LiF during the micronization of Si particles using mechanical mixing so that LiF may be blended with Si by mechanical mixing, or by coating the surface of Si particles with LiF.

The mechanical mixing uses the principle of generating surface energy by mechanical energy and carrying out coating through the adhesion and/or fusion between interfaces having high surface energy. Since at least two ingredients may be mixed or complexed at a temperature lower than the boiling points thereof by using mechanical energy, the resultant powder has a uniform composition. For example, the mechanical mixing may be carried out by using any one method selected from ball mill, beads mill, planetary ball mill, attritor, high-energy milling, vibratory mill, mechanofusion milling, shaker milling, planetary milling, disk milling, shape milling, nauta milling, nobilta milling and high-speed mixing, but is not limited thereto. According to an embodiment of the present disclosure, the mechanical mixing may be carried out by mixing Si and LiF with an adequate solvent (such as isopropyl alcohol and/or NMP)

and pulverizing the resultant product by using a method selected from the above-mentioned methods.

Meanwhile, according to an embodiment of the present disclosure, the mixed particles of Si with LiF use a starting material for Si having a purity of 98% or less in order to maintain a low surface oxidization degree of Si active materials.

According to an embodiment of the present disclosure, LiF is added during the micronization of Si particles to a particle diameter of several nanometers to several hundreds of nanometers and mechanical mixing is carried out so that the Si particles may be coated with LiF (preferably), or Si may be mixed with LiF. As described above, the finished Si crystallite size is controlled to a La value of 20 nm or less as determined by XRD. In this manner, Si—LiF mixed particles are obtained.

Next, slurry containing the Si—LiF mixed particles, a carbon precursor and a carbonaceous material is prepared (S20). According to an embodiment of the present disclosure, the carbon precursor is converted into a carbonaceous material through carbonization caused by heat treatment at high temperature. Any organic compound containing carbon may be used as a carbon precursor without particular limitation. Non-limiting examples of the carbon precursor include at least one selected from heavy oil, resin, methane, ethylene, acetylene, polyacrylonitrile, polyvinyl alcohol, cellulose, pitch, and the like. As the resin, a thermosetting resin that can be carbonized after crosslinking is suitable and particular examples of the resin include urea resin, melamine resin, phenol resin, epoxy resin, unsaturated polyester resin, alkyl resin, alkyd resin, urethane resin, or the like. However, the carbon precursor is not limited to the above-mentioned materials.

According to an embodiment of the present disclosure, the slurry may be prepared by the method as described hereinafter. First, the carbon precursor is dispersed into an adequate solvent to obtain a precursor solution. The solvent may be at least one selected from dimethyl sulfoxide, dimethyl formamide, dimethylamylamine, water, mixture of N-methyl morpholine N-oxide with water, mixture of lithium chloride with dimethylacetamide, mixture of sodium hydroxide (NaOH) with urea, quinolone, toluene, isopropyl alcohol and N-methyl pyrrolidone (NM), but is not limited thereto.

To the prepared carbon precursor solution, the Si—LiF mixed particles obtained from (S10) and a carbonaceous material are introduced and dispersed therein to obtain slurry.

In this step, the carbonaceous material introduced to the precursor solution preferably includes a high crystalline carbonaceous material, such as natural graphite, artificial graphite, carbon nanotubes, fullerene, graphene, or the like.

The carbonaceous material and the Si—LiF mixed particles may be mixed at a ratio of 10:90-90:10. In addition, the carbon precursor introduced to the precursor solution is preferably 1-40 parts by weight based on 100 parts by weight of the carbonaceous material.

Then, the slurry prepared from (S20) is dried (S30). According to an embodiment of the present disclosure, the drying may be carried out by spray drying. In the spray drying process, the inlet temperature of the spray dryer may be controlled to 60° C.-280° C. and the outlet temperature thereof may be controlled to 60° C.-280° C. The solvent of the slurry introduced in a moment evaporates and the starting materials contained in the slurry are agglomerated in the form of granules, so that initial material powder having an average particle size distribution of 50-80 μm may be obtained. After that, the initial material powder is pressurized to form pellet-like molded bodies. For example, the pressurization may be carried out by applying a pressure of 40-150 MPa to the material powder.

Then, the resultant product (e.g. pellet-like molded bodies) obtained from step (S30) is heat treated (S40).

According to an embodiment of the present disclosure, the heat treatment is carried out under inert atmosphere ($N_2$, $H_2$, CO gas, etc.) According to another embodiment of the present disclosure, the heat treatment temperature is 400° C.-1,100° C. Only the organic ingredients contained in the slurry are carbonized and thus the carbonaceous material remains. In this manner, a composite particle precursor is obtained.

Then, the resultant product (composite particle precursor) of (S40) is micronized to a desired level to obtain composite particles (S50). Carbonized pellet-like molded bodies are obtained through the heat treatment of (S40), and then they are micronized by mechanical mixing, or the like, thereby providing composite particles. At least one of the methods exemplified in step (S10) may be selected and used adequately, and thus description thereof is omitted herein. In addition, according to an embodiment of the present disclosure, mechanical mixing may be performed by carrying out additional micronization using a jet mill after the micronization as described above.

According to the present disclosure, the composite particles may have a coating layer formed after carrying out step (S50). The coating layer may be formed by carrying out mechanical mixing after mixing the composite particles obtained from step (S50) with pitch powder. The method of mechanical mixing may be carried out by at least one of the methods exemplified in step (S10) adequately, and thus description thereof is omitted herein. According to an embodiment of the present disclosure, the composite particles are mixed with pitch powder and the resultant mixture is subjected to ball milling at a speed of about 100 rpm to form a coating layer on the surfaces of the composite particles. In a variant, an amorphous carbonaceous material may be deposited on the surfaces of the composite particles through a deposition process, such as chemical vapor deposition (CVD).

In addition, according to an embodiment of the present disclosure, the composite particles obtained by the method according to the present disclosure are free from micropowder having a size of 1 μm or less. This may be accomplished by further carrying out a screening step for removing micropowder having a size of 1 μm or less, after preparing the composite particles.

In another aspect, there are provided a negative electrode including the composite particles as a negative electrode active material and an electrochemical device including the negative electrode.

According to an embodiment, the negative electrode includes a current collector and a negative electrode active material layer formed on at least one surface of the current collector.

The negative electrode current collector is provided to have a thickness of 3 μm-500 μm. The negative electrode current collector is not particularly limited, as long as it causes no chemical change in the corresponding battery and has conductivity. Particular examples of the negative electrode current collector may include stainless steel; aluminum; nickel; titanium; baked carbon; copper; stainless steel surface-treated with carbon, nickel, titanium or silver; or the like. It is possible to increase the adhesion of a negative electrode active material by forming fine surface irregularities on the surface of the negative electrode current collector, in the same manner as a positive electrode current collector. The negative electrode current collector may have various shapes, such as a film, sheet, foil, net, porous body, foam and a non-woven web body.

In addition, the negative electrode active material layer includes a negative electrode active material, a conductive material and a binder.

The negative electrode active material may include, besides the composite particles according to the present disclosure, at least one selected from: carbon such as non-graphitizable carbon or graphite-based carbon; metal composite oxides, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements of Group 1, 2 or 3, halogen; $0 < x \le 1$; $1 \le y \le 3$; $1 \le z \le 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; and lithium titanium oxide.

The conductive material is used for providing an electrode with conductivity. Any material may be used, as long as it causes no chemical change in the corresponding battery and is an electron conductive material. Particular examples of the conductive material include: carbonaceous materials, such as natural graphite, artificial graphite, carbon black, acetylene black, ketjen black, carbon fibers, or the like; metallic materials, such as metal powder or metal fibers of copper, nickel, aluminum, silver, or the like; conductive polymers, such as polyphenylene derivatives; or combinations thereof.

The binder functions to assist binding of the negative active material particles among themselves and binding of the negative electrode active material to a current collector. Particular examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-containing polymer, polyvinyl pyrrolidone, polyurethane, polytetrafluoroethylene, polyvinylidene fluoride, polyethylene, polypropylene, styrene butadiene rubber, acrylated styrene butadiene rubber, epoxy resin, nylon, or the like.

In still another aspect, there is provided an electrochemical device including the negative electrode.

The electrochemical device includes a negative electrode, a positive electrode and a separator interposed between the negative electrode and the positive electrode.

According to the present disclosure, the positive electrode includes at least one positive electrode active material selected from: lithium nickel manganese composite oxides (LNMO) represented by the chemical formula of $LiMyO_2$ (wherein M is $M'_{1-k}A_k$, M' is $Ni_{1-a-b}(Ni_{1/2}Mn_{1/2})_aCo_b$, $0.65 \le a+b \le 0.85$, $0.1 \le b \le 0.4$, $0 \le k \le 0.05$, $x+y=2$, and $0.95 \le y \le 1.05$); layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0 to 0.33), $LiMnO_3$, $LiMn_2O_3$ and $LiMnO_2$; lithium manganese composite oxides represented by the chemical formula of $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; and iron ion phosphate compounds ($LiFePO_4$) represented by the chemical formula of $Li_{1-a}Fe_{1-x}M_x(PO_{4-b})X_b$ (wherein a is −0.5 to 0.5, x is 0 to 0.5, b is 0 to 0.1).

The same current collector, conductive material and binder as described with reference to the negative electrode may be used herein, but the present disclosure is not limited thereto.

Any separator may be used without particular limitation, as long as it can be used as a separator material for conventional electrochemical devices. For example, the separator may be a porous polymer film or non-woven web including at least one of polymer resins, such as polyolefin, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. According to an embodiment of the present disclosure, the separator may be a stacked separator including at least two different substrates stacked successively.

In addition, the electrochemical device includes an electrolyte containing a non-aqueous electrolyte and a lithium salt.

According to the present disclosure, the non-aqueous solvent may include at least one selected from carbonate, ester, ether, ketone, alcohol and aprotic solvents. Particular examples of the carbonate solvent include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), or the like. Particular examples of the ester solvent include methyl acetate, ethyl acetate, n-propyl acetate, dimethyl acetate, methyl propionate, valerolactone, mevalonolactone, caprolactone, or the like. Particular examples of the ether solvent include dibutyl ether, tetraglyme, diglyme, dimethoxyethane, 2-methyltetrhydrofuran, tetrahydrofuran, or the like. Particular examples of the ketone solvent include cyclohexanone, or the like. In addition, particular examples of the alcohol solvent include ethyl alcohol, isopropyl alcohol, or the like. Particular examples of the aprotic solvent include nitriles such as R—CN (wherein R is a C2-C20 linear, branched or cyclic hydrocarbon group and may contain a double bond aromatic ring or ether bond), amides such as dimethylformamide, dioxolanes such as 1,3-dioxolane, sulfolanes, or the like.

The lithium salt is a material which is dissolved in an organic solvent, serves as a lithium ion-supplying source in a battery to allow basic operation of a lithium secondary battery and accelerates transport of lithium ions between a positive electrode and a negative electrode. According to the present disclosure, the lithium salt is used at a concentration of 0.1 mol/L-2 mol/L in the electrolyte. The lithium salt may include at least one selected from the group consisting of LiFSI, $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein each of x and y represents a natural number), LiCl, LiI and $LiB(C_2O_4)_2$ (lithium bis(oxalato) borate; LiBOB).

According to the present disclosure, the electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer secondary batteries, are preferred.

In still another aspect, there is provided a battery module including the secondary battery as a unit cell, a battery pack including the battery module, and a device including the battery pack as an electric power source.

Particular examples of such devices may include but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Hereinafter, the present disclosure will be explained in more detail with reference to examples. However, the following examples are for illustrative purposes only and the scope of the present disclosure is not limited thereto.

Preparation of Negative Electrode Active Material 1

Si—LiF mixed particles were prepared by carrying out mechanical alloying of Si (purity 97%, Aldrich) and LiF (Aldrich) using a vibratory mill. Si was mixed with LiF and the resultant mixture was added to IPA solution at a solid content of 10% and pulverization was carried out by using a high energy mill (Netzsch) for 30 hours. Herein, Si and LiF were used at a ratio of 2 parts by weight of LiF based on 100 parts by weight of Si.

Si crystallites in the resultant mixed particles had a La value of 20 nm as determined by XRD.

Next, pitch was introduced to NMP to prepare a precursor solution, and graphite and the Si—LiF mixed particles were introduced to and dispersed in the precursor solution to obtain slurry. Herein, pitch, the carbonaceous material (graphite) and the mixed particles were used at a weight ratio of 20:60:20, and the slurry had a solid content of 70%. The slurry was spray dried through a spray drier to obtain dried powder having a particle diameter of about 1-40 μm. The spraying drying was carried out at a temperature controlled to about 120° C.-150° C.

The dried powder was pressurized (100 MPa) to mold it into a pellet-like shape. The resultant pellets were introduced to a heating furnace and warmed to about 1,000° C. under $N_2$ atmosphere to carry out carbonization. The carbonized pellets were pulverized by using a pin mill and then an air jet mill to obtain powder of composite particles having a particle diameter ($D_{50}$) of about 10 μm.

The composite powder was mixed with pitch powder to obtain a mixture and the resultant mixture was pulverized by using a ball mill at a speed of about 100 rpm so that the surfaces of the composite particles may be coated with pitch. Then, the pitch-coated composite particles were introduced to a heating furnace and warmed to about 1,000° C. under $N_2$ atmosphere to carbonize pitch, thereby providing composite particles.

Preparation of Negative Electrode Active Material 2

Si (purity 97%, Aldrich) was mechanically micronized by using a vibratory mill. Si was added to IPA solution at a solid content of 10% and pulverization was carried out by using a beads mill (Netzsch) for 30 hours. Herein, the micronized Si crystallites had a La value of 20 nm as determined by XRD.

Next, pitch was introduced to NMP to prepare a precursor solution, and graphite and the Si particles were introduced to and dispersed in the precursor solution to obtain slurry. Herein, pitch, the carbonaceous material (graphite) and Si particles were used at a weight ratio of 20:60:20, and the slurry had a solid content of 70%. The slurry was spray dried through a spray drier controlled to about 120° C.-150° C. to obtain dried powder having a particle diameter of about 1-40 μm.

The dried powder was pressurized (100 MPa) to mold it into a pellet-like shape. The resultant pellets were introduced to a heating furnace and warmed to about 1,000° C. under $N_2$ atmosphere to carry out carbonization. The carbonized pellets were pulverized by using a pin mill and then an air jet mill to obtain powder of composite particles having a particle diameter ($D_{50}$) of about 12 μm.

The composite powder was mixed with pitch powder to obtain a mixture and the resultant mixture was pulverized by using a ball mill at a speed of about 100 rpm so that the surfaces of the composite particles may be coated with pitch. Then, the pitch-coated composite particles were introduced to a heating furnace and warmed to about 1,000° C. under $N_2$ atmosphere to carbonize pitch, thereby providing active material particles.

Example 1 (Manufacture of Battery)

The composite particles obtained from Preparation Example 1, a conductive material (carbon black, KS6) and polyacrylonitrile were mixed at a weight ratio of 70:20:10, and the resultant mixture was introduced to deionized water and mixed therewith to obtain electrode slurry. The slurry was coated on copper foil having a thickness of 20 μm as a current collector to a thickness of 60 μm and then dried to provide an electrode.

As a counter-electrode, lithium metal having a thickness of 0.3 t (300 μm) was used to fabricate a 2032-sized coin half-cell.

A separator (separator made of polyethylene, thickness: 20 μm) was interposed between the resultant electrode and the counter-electrode to form an electrode assembly. The electrode assembly was received in a battery casing, and an electrolyte including an organic solvent (fluoroethylene carbonate:diethyl carbonate=3:7, volume ratio) containing 1M $LiPF_6$ and 3 wt % of vinylene carbonate (VC, additive) was used to obtain a coin cell.

Example 2 (Manufacture of Battery)

A battery was manufactured in the same manner as described in Example 1, except that an electrolyte including an organic solvent (ethylene carbonate:ethyl methyl carbonate=3:7, volume ratio) containing 1M $LiPF_6$ and 0.5 wt % of vinylene carbonate (VC, additive) was used.

Comparative Example 1 (Manufacture of Battery)

A battery was manufactured in the same manner as described in Example 1, except that the composite particles obtained from Preparation Example 2 were used.

Evaluation of Battery Characteristics

Figure 2:
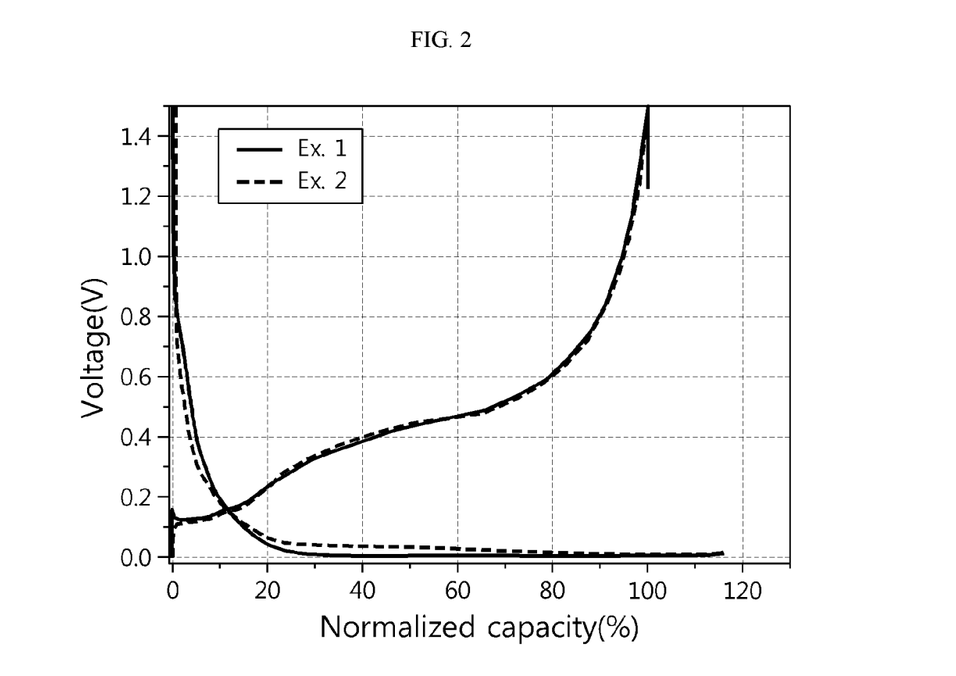
FIG. 2 is a graph illustrating the initial charge/discharge efficiency of the battery according to an embodiment of the present disclosure.

The initial charging/discharging condition for each of the batteries was shown below. The results are shown in the following Table 1 and FIG. 2.

Example 1: the initial charging/discharging was carried out under the condition of charging with CC/CV (constant current/constant voltage) mode at 0.1 C (5 mV, 0.005 C cut off) and discharging to 1.5V at 0.1 C under with a constant current mode.

Example 2: the initial charging/discharging was carried out under the condition of charging with CC/CV mode at 0.1 C (10 mV, 0.01 C cut off) and discharging to 1.5V at 0.1 C under with a constant current mode.

Comparative Example 1: the initial charging/discharging was carried out under the condition of charging with CC/CV mode at 0.1 C (5 mV, 0.005 C cut off) and discharging to 1.5V at 0.1 C under with a constant current mode.

TABLE 1

|  | Discharge capacity (mAh/g, 1.5 V) | Charge capacity (mAh/g) | Initial efficiency (%, 1.5 V) |
|---|---|---|---|
| Example 1 | 1,319.7 | 1,512.7 | 87.24 |
| Example 2 | 1,282.5 | 1,475.7 | 86.90 |
| Comp. Ex. 1 | 1,250 | 1,453.4 | 86.00 |

As can be seen from the results, the batteries according to Examples 1 and 2 show higher initial efficiency as compared to the battery according to Comparative Example 1.

DESCRIPTION OF MAIN DRAWING NUMERALS

100: Composite particles
110: Si—LiF composite particles
111: LiF
112: Si
120: High crystalline carbonaceous material
130: Low crystalline and/or amorphous carbonaceous material
140: Coating layer
150: Carbon phase

What is claimed is:

1. A negative electrode active material for an electrochemical device comprising composite particles which comprise:
   a carbon phase comprising a carbonaceous material, silicon (Si) and lithium fluoride (LiF), wherein the Si and LiF are present as Si—LiF composite particles, wherein the Si—LiF mixed particles consist of Si particles at least partially surface coated with LiF,
   wherein the carbonaceous material is a mixture of high crystalline carbon with low crystalline carbon,
   wherein the low crystalline carbon is present in the composite particles as a matrix, and
   wherein the high crystalline carbon and Si—LiF mixed particles are dispersed in the matrix.

2. The negative electrode active material according to claim 1, wherein the Si particles have a particle diameter ($D_{50}$) of 1 nm-700 nm.

3. The negative electrode active material according to claim 2, wherein the Si particles have a crystallite size La of 20 nm or less as determined by X-ray diffractometry (XRD).

4. The negative electrode active material according to claim 1, wherein the carbonaceous material is any one selected from the group consisting of natural graphite, artificial graphite, carbon nanotubes, low crystalline soft carbon, graphene, fullerene, carbon fibers, pyrolitic carbon, mesophase pitch based carbon fibers, meso-carbon microbeads, mesophase pitches and petroleum or coal tar pitch derived cokes and carbon black, or a combination of two or more of them.

5. The negative electrode active material according to claim 1, wherein the composite particles comprise the carbonaceous material in an amount of 10-90 wt %.

6. The negative electrode active material according to claim 1, wherein the composite particles have a particle diameter of 1 μm-100 μm and have a 50% particle diameter ($D_{50}$) of 1 μm-50 μm in a particle size distribution of cumulative volume.

7. The negative electrode active material according to claim 1, wherein the composite particles are at least partially surface-coated with a coating layer containing a low crystalline carbonaceous material, and the coating layer has a thickness of 5 nm-100 nm.

8. The negative electrode active material according to claim 7, wherein the coating layer comprises the low crystalline carbonaceous material in an amount of 90 wt % or more based on 100 wt % of the coating layer.

9. A method for preparing the negative electrode active material as defined in claim 1, which comprises the following steps (S10) to (S50) of:
   (S10) preparing Si—LiF mixed particles;
   (S20) preparing a slurry comprising the Si—LiF mixed particles, a carbon precursor and a carbonaceous material;
   (S30) drying the slurry;
   (S40) heat treating the dried product obtained from step (S30) to obtain a precursor of composite particles; and
   (S50) micronizing the precursor of composite particles obtained from step (S40) to obtain composite particles,
   wherein step (S10) of preparing the Si—LiF mixed particles is carried out by mechanically mixing Si with LiF.

10. The method for preparing the negative electrode active material according to claim 9, wherein the carbon precursor is present as a carbon precursor solution which comprises at least one selected from the group consisting of polyacrylonitrile, polyvinyl alcohol, cellulose and pitch, dispersed in a dispersion medium.

11. The method for preparing the negative electrode active material according to claim 9, wherein Si is a Si material having a purity of 98% or less.

12. The method for preparing the negative electrode active material according to claim 9, wherein the carbon precursor is at least one selected from the group consisting of polyacrylonitrile, polyvinyl alcohol, cellulose and pitch.

13. The method for preparing the negative electrode active material according to claim 9, wherein step (S40) is carried out at 400° C.-1,100° C.

* * * * *